Feb. 23, 1926.  
L. G. CHAPMAN  
TOW LINE FOR AUTOMOBILES  
Filed Oct. 24, 1925  
1,574,552
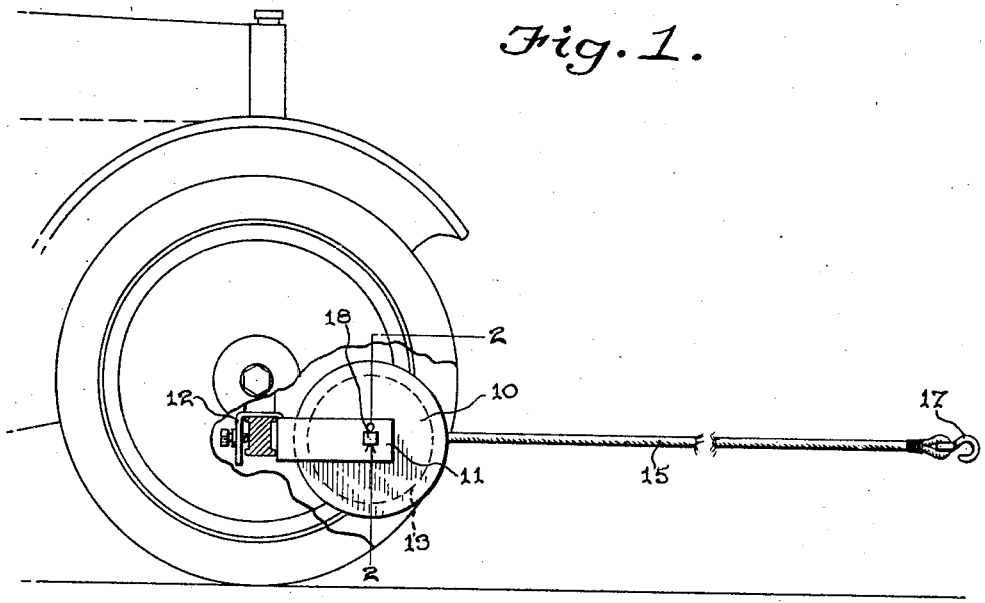
Fig. 1.
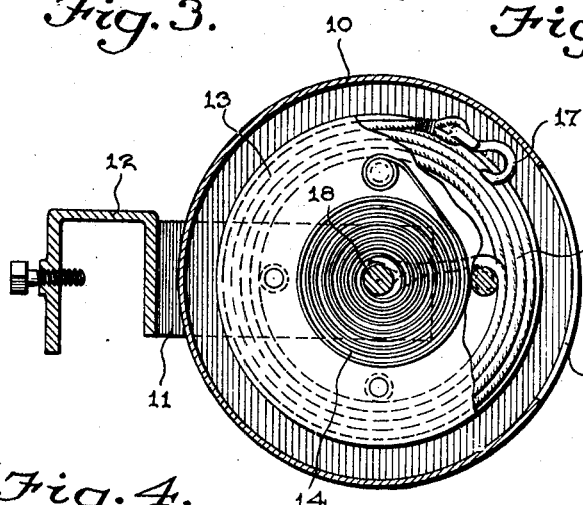
Fig. 3.   Fig. 2.
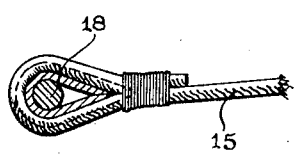
Fig. 4.
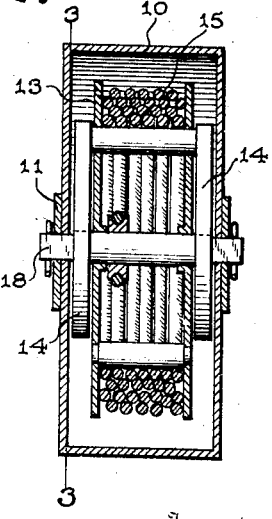
L. G. Chapman, Inventor Patented Feb. 23, 1926.

1,574,552

UNITED STATES PATENT OFFICE.

LESLIE G. CHAPMAN, OF BANGOR, MAINE.

TOWLINE FOR AUTOMOBILES.

Application filed October 24, 1925. Serial No. 64,641.

*To all whom it may concern:*

Be it known that LESLIE G. CHAPMAN, a citizen of the United States of America, residing at Bangor, in the county of Penobscot and State of Maine, has invented new and useful Improvements in Towlines for Automobiles, of which the following is a specification.

The object of the invention is to provide an efficient tow line for automobiles and similar vehicles which may be permitted to remain permanently in position on the vehicle subject to use when required and having the extension and cushioning characteristics essential to a device of this type; and with this object in view the invention consists in a construction and combination of parts of which a preferred embodiment is shown in the accompanying drawings, wherein:—

Figure 1 is a side view of a tow line apparatus embodying the invention applied in the operative position to a vehicle of the automobile type which is indicated merely in outline.

Figure 2 is a detail view of the device partly in section.

Figure 3 is a cross-sectional view.

Figure 4 is a detail of the cable connection.

Within a suitable casing 10 which is provided with a supporting yoke 11 and a hook 12 or the equivalent thereof as a means of attachment to the front axle of the vehicle, is mounted a revoluble drum 13 having a rewinding spring 14 and carrying a cable 15 entering the casing through a suitable opening 16. The free end of the cable is provided with a hook or equivalent engaging means 17 for attachment to the rear axle of a towing vehicle or to the rear axle of the vehicle with which the hook 12 is engaged if the tow line attachment is designed to form a permanent and readily available adjunct of or accessory to the vehicle in connection with which it is used.

The spindle 18 of the drum and upon which the latter is revolubly mounted is non-rotatably secured in the side walls of the casing and serves at its projecting extremities as the means for the attachment of the yoke 11, and the take-up spring by which the drum is actuated serves not only to rewind the cable when strain is removed therefrom so as to maintain a taut condition of the cable, but as a cushioning means for the cable in that the operation thereof as a tow line, to minimize jarring or jerking in the transmission of motion from the towing vehicle to the towed vehicle.

Having described the invention, what is claimed as new and useful is:—

A self winding tow line for vehicles having a casing, means for connecting the casing with the front axle of a vehicle, a drum revolubly mounted in the casing and having a cable reeled thereon and extended through an opening in the side of the casing for terminal attachment to a towing vehicle, and a drum rewinding spring housed within the casing, the said drum having a transverse spindle terminally secured in the side walls of the casing, and the means of engagement with the front axle consisting of a yoke straddling the casing and engaged with the extremities of said spindle.

In testimony whereof he affixes his signature.

LESLIE G. CHAPMAN.